United States Patent [19]

Schaffner

[11] Patent Number: 5,278,924
[45] Date of Patent: Jan. 11, 1994

[54] PERIODIC DOMAIN REVERSAL ELECTRO-OPTIC MODULATOR

[75] Inventor: James H. Schaffner, Chatsworth, Calif.

[73] Assignee: Hughes Aircraft Company, Los Angeles, Calif.

[21] Appl. No.: 13,394

[22] Filed: Feb. 4, 1993

[51] Int. Cl.[5] .............................................. G02B 6/10
[52] U.S. Cl. ........................................... 385/3; 385/4; 385/9; 385/10
[58] Field of Search .................. 385/3, 4, 10, 8, 9, 385/1, 2, 122; 372/12, 64; 359/279

[56] References Cited

U.S. PATENT DOCUMENTS

| | | | |
|---|---|---|---|
| 4,709,978 | 12/1987 | Jackel | 385/3 |
| 5,005,932 | 4/1991 | Schaffner et al. | 385/3 |
| 5,036,220 | 7/1991 | Byer et al. | 385/122 |
| 5,074,631 | 12/1991 | Hamano et al. | 385/3 |
| 5,082,349 | 1/1992 | Cordova-Plaza et al. | 385/2 |
| 5,193,128 | 3/1993 | Farina et al. | 385/3 |

OTHER PUBLICATIONS

Integrated Photonics Research 1991 (p. 21) (No Month).
Velocity-Matching Techniques for Integrated Optic Traveling Wave Switch/Modulators by Rod C. Alferness, Steven K. Korotky, and Enrique A. J. Marcatili, Mar. 1984 IEEE (9 pages).
Traveling-wave Electrooptic Modulator by C. M. Gee, G. D. Thurmond and H. W. Yen dated 1 Jul. 1983 (4 pages).
Traveling-wave 1.3-μm Interferometer Modulator With High Bandwidth, Low Drive Power, and Low Loss by David W. Dolfi, 1 Aug. 1986/vol. 25, No. 15/Applied Optics (2 pages).
Waveguide Electrooptic Modulators by Rod C. Alferness, Aug. 1982 IEEE (17 pages).
Ferroelectric Domain Inversion In Ti-diffused LiNbO$_3$ Optical Waveguide by Shintaro Miyazawa, Jul. 1979 American Institute of Physics (5 pages).
Quasi-phase-matched Interactions In Lithium Niobate by M. M. Fejer, G. A. Magel and E. J. Lim, SPIE vol. 1148 Nonlinear Optical Properties of Materials (1989), (12 pages) (no month).
Solid State Physics, by Gerald Burns, Academic Press, Orlando 1984 (2 pages) (no month).
20 GHz Electro-Optic Polymer Mach-Zehnder Modulator by Girton, et al-1991 American Institute of Physics-22 Apr. 1991-3 pages.

Primary Examiner—John D. Lee
Assistant Examiner—Phan Thi Heartney
Attorney, Agent, or Firm—Charles D. Brown; Randall M. Heald; W. K. Denson-Low

[57] ABSTRACT

In accordance with the teachings of the present invention, an enhanced performance opto-electric modulator (30 or 70) is provided herein which compensates for phase velocity mismatches between optical modulation and an RF electric signal. The modulator (30) includes an optical waveguide (38, 40) formed in a substrate (32) and coupled to an optical input (56). An RF waveguide (46, 48) is formed on the substrate (32) for applying an electric field (59) to a modulation region (50) adjacent the optical waveguide so as to modulate an optical signal. The substrate (32) has a ferroelectric domain which includes periodically inverted and non-inverted regions (54) and (52) which compensate for phase differences within the modulation region (50). In a preferred embodiment, the optical waveguide includes two substantially parallel optical waveguides (38) and (40) which have outputs combined to provide for an amplitude modulated (AM) optical output signal (60).

18 Claims, 3 Drawing Sheets

PERIODIC DOMAIN REVERSAL ELECTRO-OPTIC MODULATOR

BACKGROUND OF THE INVENTION

1. Technical Field

This invention relates generally to electro-optic modulators for modulating optical signals and, more particularly, to a phase velocity matched electro-optic modulator.

2. Discussion

Travelling wave integrated electro-optic modulators are known in the art for providing amplitude and phase modulation of an optical signal. Electro-optic modulators are commonly used with fiber optic links which have become increasingly important for a number of applications that include millimeter wave communications and radar systems. An external electro-optic modulator is generally required for a millimeter wave fiber optic link since direct modulation of a solid state laser signal generally is not possible above microwave frequencies.

Electro-optic modulators typically include an optical waveguide formed in a substrate and having an overlying metallic electrode structure. Electro-optic modulators fabricated in substrate materials in which the optical and microwave phase velocities are equal offer the potential of very broad modulation bandwidths. However, for important electro-optic substrate materials such as lithium niobate (LiNbO$_3$), there is an inherent mismatch between the optical and RF microwave velocities. Since the optical signal phase velocity in lithium niobate is nearly twice the microwave drive signal velocity, the magnitude of the phase modulation begins to degrade as the phase difference between the optical and drive signals increases. This phenomenon is often referred to as phase "walk off".

This velocity mismatch necessitates design trade-offs. On the one hand, the maximum achievable drive frequency decreases as the modulator length is increased. On the other hand, to lower the drive voltage and power that is required, a longer device length is generally required. Thus, a trade-off is generally made between maximum drive frequency and required drive power.

Prior attempts have been made in order to compensate for the inherent velocity mismatch. Periodic electrode structures have been used in coplanar electrooptic modulators and are generally categorized as periodic phase reversal electrodes or intermittent interaction electrodes. Known periodic electrode configurations include unbalanced transmission lines which are asymmetric about a propagation axis. However, this may lead to incompatibility with the balanced line transitions to other fiber optic link transmitter components.

A more recent example of an electro-optic modulator is found in U.S. Pat. No. 5,005,932 issued to Schaffner, et al. This prior art modulator achieves velocity matching of the optical and RF signal by employing travelling wave electrodes with periodic discontinuities. While this approach is generally feasible for most applications, the discontinuities may inherently cause reflection of portions of the RF signal back toward the source along with electromagnetic scattering of portions of the RF signal into the lithium niobate substrate. As a consequence, such prior art approaches generally suffer from these losses, especially at high frequencies such as those in the millimeter wave range.

It is therefore desirable to provide for an improved electro-optic modulator which does not suffer from undesirable RF reflections or scattering such as that which may be present in the prior art. In particular, it is desirable to provide for an improved technique of resetting the phase difference in millimeter wave integrated electro-optic modulators which exhibit velocity mismatches between the RF and optical signals.

SUMMARY OF THE INVENTION

In accordance with the teachings of the present invention, an electro-optic modulator is provided which compensates for phase velocity mismatch between an optical signal and an RF signal. The modulator includes an optical waveguide formed in a ferroelectric substrate and coupled to an optical input. An RF waveguide is formed on the substrate for applying an electric field to a region adjacent to the optical waveguide so as to modulate an optical signal. The ferroelectric substrate has periodically inverted and non-inverted ferroelectric domain regions which compensate for phase differences within the modulation region. In a preferred embodiment, the RF waveguide couples to an optical waveguide Mach-Zehnder interferometer to provide for amplitude modulation (AM) of the optical signal.

BRIEF DESCRIPTION OF THE DRAWINGS

Other objects and advantages of the present invention will become apparent to those skilled in the art upon reading the following detailed description and upon reference to thee drawings in which.

DETAILED DESCRIPTION OF THE PREFERRED EMBODIMENTS

Figure 1:
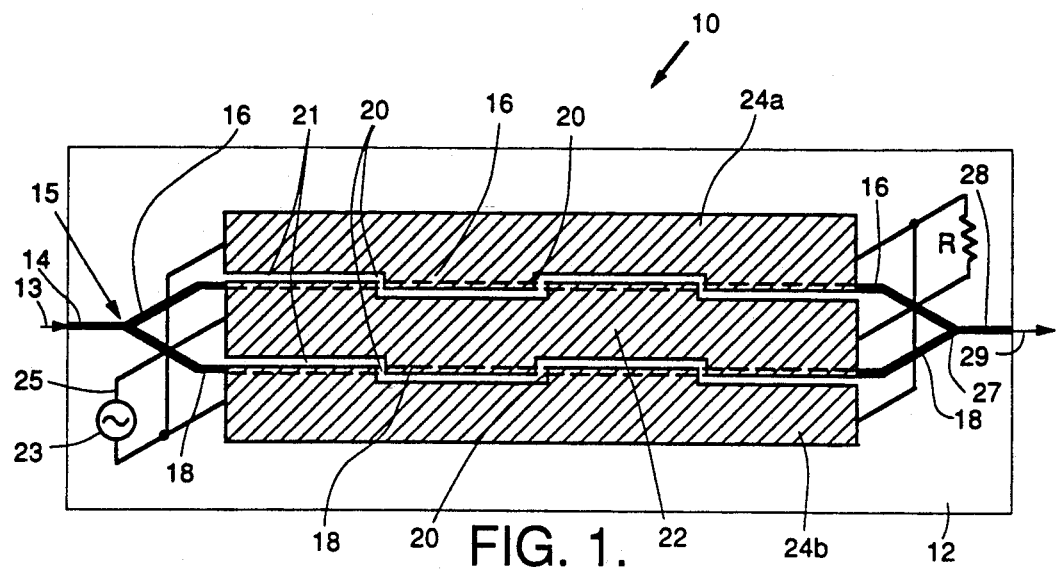
FIG. 1 is a top view of a conventional periodic phase electro-optic modulator in accordance with the prior art.

An existing electro-optic modulator 10 is provided in FIG. 1 in accordance with the prior art. The prior art electro-optic modulator 10 shown herein is a periodic phase reversal (PPR) modulator which is fabricated on a lithium niobate (LiNbO$_3$) substrate 12. The prior art PPR modulator 10 incorporates an integrated optic Mach-Zehnder interferometer for transmitting an optical signal therethrough and a periodic phase reversal (PPR) electrode for applying an electric field to the optical signal to induce phase modulation thereon.

According to the prior art, the Mach-Zehnder interferometer includes a pair of optical waveguide channels 16 and 18 formed in the substrate 12 which have portions thereof located parallel to one another. The interferometer further includes an optical input path 14 that leads to an input Y-junction 15 which in turn splits an optical input signal 13 between the first and second optical waveguides 16 and 18. The interfermeter likewise includes an output Y-junction 27 which joins the output of the first and second optical waveguides 16 and 18 and provides an amplitude modulated (AM) output signal 29 to a modulator output path 28.

The PPR electrode includes an active center conductor 22 and a pair of grounded conductors 24a and 24b which apply an RF electrical field across the optical signal 13. The center conductor 22 is disposed above an area between optical waveguides 16 and 18. The pair of grounded conductors 24a and 24b are disposed above an area on the outer sides of optical waveguides 16 and 18. Accordingly, the center conductor 22 receives the RF signal from a power source 23, while the grounded conductors 24a and 24b are generally coupled to the low ground reference.

Accordingly, the optical input signal 13 travels through the optical waveguides 16 and 18 and interacts with the RF input signal 25 so as to generate phase modulation thereon. However, it is generally known that the phase velocity of an RF electric signal is generally less than the phase velocity of an optical signal by approximately a factor of 0.6 in lithium niobate. Thus, if the modulator 10 is long enough, the phase difference between the RF signal and the modulation induced on the optical signal will reach 180 degrees at some point. In order to compensate for this phase difference, the conventional approach uses the periodic phase reversal electrode to reverse the direction of the electrical field with respect to the optical signal by jogging portions 20 of the electrode around the optical waveguides 16 and 18. The effect of this is to make the total phase difference between the modulation on the optical signal 13 and RF signal 25 become 360 degrees and to thereby realign the RF and optical signals.

Accordingly, the prior art approach provides for an electrode having air gaps 21 with electrode jogs 20 at locations in which the phase difference between the RF electric signal 13 and the modulation on optical signal 25 reaches a 180 degree difference. However, the prior art approach requires that the RF signal 25 be physically moved about the sides of the optical waveguides 16 and 18 by periodic electrode discontinuities. At very high frequencies, the prior art discontinuities generally cause a fraction of the RF signal 25 to be reflected back toward the RF source 23 and a fraction of the RF signal 25 to be scattered into the substrate 12. As a consequence, this back-reflection and scattering results in undesirable signal loss.

Figure 2:
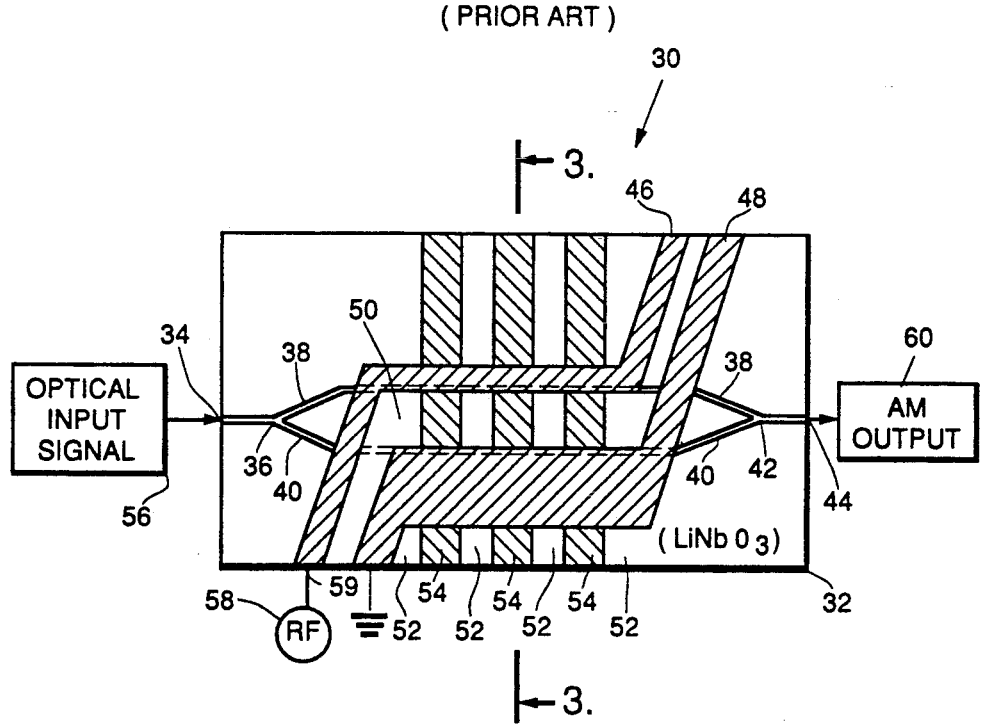
FIG. 2 is a top view of an electro-optic modulator in accordance with the preferred embodiment of the present invention.
Figure 3:
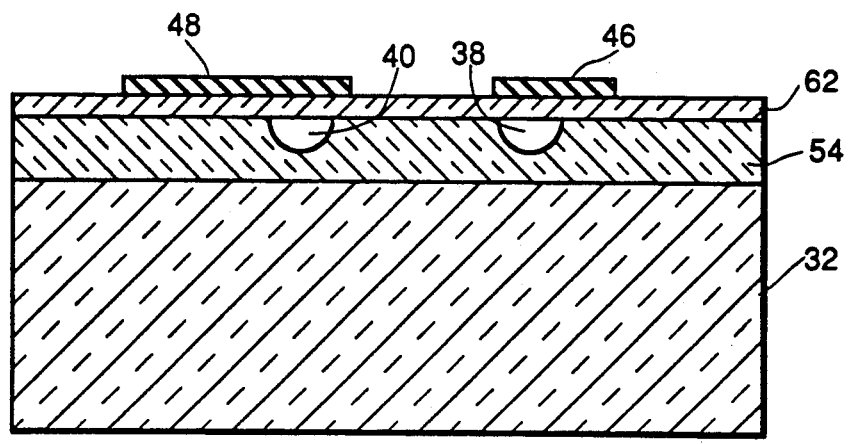
FIG. 3 is a cross-sectional view taken along line 3—3 of FIG. 2.

Turning now to FIGS. 2 and 3, a periodic domain reversal electro-optic modulator 30 is shown therein in accordance with the present invention. The periodic domain inversion electro-optic modulator 30 is fabricated on the +Z face of a lithium niobate (LiNbO$_3$) substrate 32 in accordance with a preferred embodiment of the present invention. The substrate has a ferroelectric domain with selected regions formed to provide opposite changes in direction. The modulator 30 includes an integrated optic Mach-Zehnder interferometer for guiding an optical signal 56 through the modulator 30. The modulator 30 further includes an asymmetric coplanar waveguide travelling wave electrode for applying an electric field across the optical signal 56 to induce phase modulation on the optical signal 56 in each waveguide.

The interferometer includes an optical input terminal 34 for receiving an optical input signal 56 and an output terminal 44 for providing an amplitude modulated (AM) optical output signal 60. The interferometer further includes an input Y-junction 36 which splits the optical input signal 56 between a pair of optical waveguide channels 38 and 40. The pair of optical waveguide channels 38 and 40 have portions thereof that are located substantially parallel to each other. The interferometer likewise has an output Y-junction 42 which combines the pair of optical waveguide channels 38 and 40 which in turn then leads to the output terminal 44.

The interferometer and associated optical waveguide channels 38 and 40 are fabricated within the lithium niobate substrate 32 by diffusing titanium into the substrate 32 to form the optical waveguide channels 38 and 40 in accordance with established techniques known in the art. The optical waveguide channels 38 and 40 are formed with portions arranged substantially parallel to one another which are subjected to one or more opposite changes in direction in the ferroelectric domain. In addition, a silicon dioxide buffer layer 62 is preferably disposed on top of the substrate 32 for purposes of preventing optical losses from the optical waveguide channels 38 and 40 that may otherwise be caused by the metallic electrodes 46 and 48.

The asymmetric coplanar waveguide travelling wave electrode is formed on top of the buffer layer 62 in an area substantially above the first and second waveguide channels 38 and 40. The travelling wave electrode includes an active conductive line 46 and a conductive ground line 48. The active conductive line 46 is coupled to an RF power source 58 for receiving the RF electric signal 59. The conductive ground line 48, on the other hand, is coupled to ground. The active conductive line 46 is displaced from the conductive ground line 48 and, as a result, forms an active modulation region 50 and operates to apply an RF electric field across the modulation region 50. Accordingly, the electric field causes the optical input signal 56 to be phase modulated in each of the optical waveguide channels 38 and 40.

According to the present invention, the modulator 30 is fabricated in a substrate 32 which has a ferroelectric domain that has inverted regions 54 and noninverted regions 52. The inverted and non-inverted regions 54 and 52 of the ferroelectric domain are defined during the fabrication process through photolithographic techniques known in the art. One such technique is described in an article by Shintaro Miyazawa, entitled "Ferroelectric Domain Inversion in Ti-Diffused LiNbO$_3$ Optical Waveguide", *J. Appl. Phys.*, 50(7), July 1979, pgs. 4599–4603. In so doing, a thin titanium layer of approximately 500 angstroms is evaporated within each of the regions that are to be formed into inverted regions 52. The titanium is then diffused into the substrate 32 at a temperature above the Curie temperature for titanium doped lithium niobate at approximately 1000 degrees Centigrade, so that the ferroelectric domain inversion may occur.

The inverted and non-inverted regions 52 and 54 are selected so as to provide phase compensation at locations selected along the optical waveguide channels 38 and 40 where the phase difference between the modulation of optical input signal 56 and the RF electric signal 59 reaches 180 degrees. Accordingly, this compensation changes the sign of the induced phase modulation of the optical signal 56 so that the overall phase difference between the modulation of optical signal 56 and RF electric signal 59 is 360 degrees and the signals are back in phase. This enables the modulator 30 to achieve continued modulation gain.

In operation, the periodic domain reversal electro-optic modulator 30 receives an optical input signal 56 which passes through the optical waveguide channels 38 and 40. The RF electric signal 59 is applied via an RF power source 58 to generate an electric field which in turn induces phase modulation on optical input signal 56. In doing so, the optical input signal 56 is received by an input terminal 34 which leads to an input Y-junction 36 that evenly splits the optical input signal 56 between first and second optical waveguide channels 38 and 40.

Optical waveguide channels 38 and 40 have portions which extends substantially parallel to one another and subject the optical input signal 56 to the electric field within active modulation region 50. As the optical signal 56 passes through each of optical waveguide channels 38 and 40, the optical signal 56 in each channel is phase modulated. In doing so, the optical signal 56 passes through inverted regions 54 and non-inverted regions 52 of the ferroelectric domain within the active modulation region 50. Each transition between inverted region 54 and non-inverted regions 52 changes the sign of the induced phase modulation of the optical signal. This compensates for 180 degree phase difference between the modulation on optical signal 56 and the RF electric signal 59 caused by the phase velocity mismatch between the RF and optical signals.

The optical waveguides 38 and 40 are joined together at an output Y-junction 42 which leads to an output terminal 44. Accordingly, the phase modulated optical signals are brought together and combined via the output Y-connector 42 so as to achieve an amplitude modulated (AM) output signal 60. The principle of combining the pair of phase modulated optical signals to form an amplitude modulated signal is well known in the art and therefore need not be explained herein. It is conceivable that if one desires a phase modulated output signal, a single optical waveguide could be employed in place of the first and second optical waveguides 38 and 40 without departing from the spirit of this invention.

Figure 4:
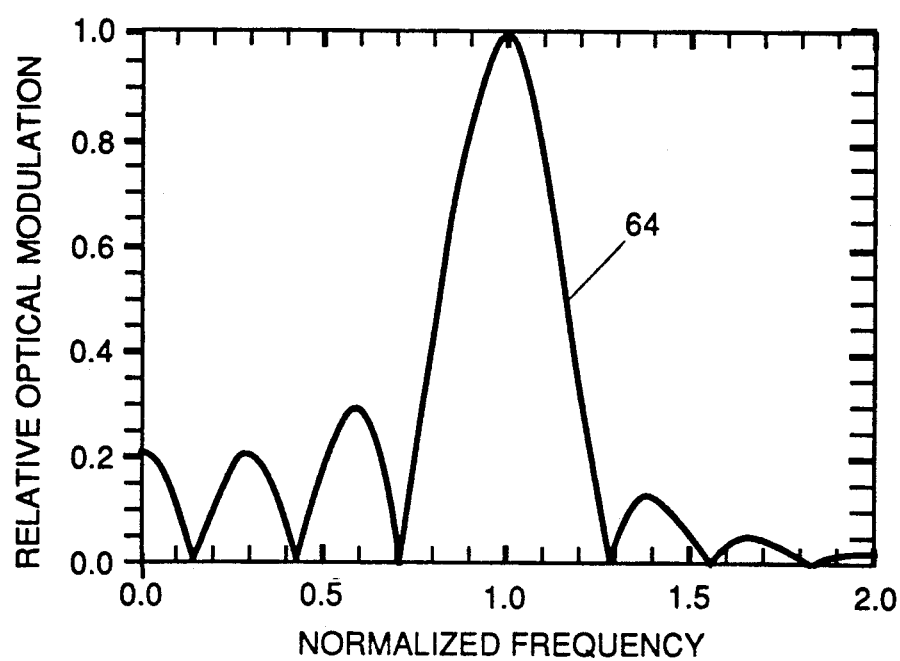
FIG. 4 is a graphic display which illustrates the frequency response for one example of an electro-optic modulator in accordance with the present invention.

In accordance with one example of the preferred embodiment of the present invention, calculated performance data is provided in a graph showing relative optical modulation 64 over a normalized frequency range in FIG. 4. The particular example used therein provided for an active modulation region 50 in which the optical input signal 56 is subjected to seven periodic inverted and non-inverted regions 52 and 54 at a frequency of approximately 60 GHz. This means the modulator 30 provided for phase compensation a total of six times. Accordingly, the graph shows very high performance for amplitude modulating an optical signal with minimal loss.

According to FIG. 4, the frequency is normalized to the design frequency of sixty (60) GHz and the optical modulation 64 is normalized to the peak response. The periodic domain reversal modulator 30 has a bandpass because at normalized frequencies away from 1.0 the phase modulation of the optical signal is changed by 180 degrees at the inverted/non-inverted domain boundaries, but the phase difference between the optical and RF signal is not 180 degrees at the boundaries. Thus, a residual phase-mismatch exists at the beginning of each modulation section and the accumulation of this residual phase-mismatch causes the degradation of the modulator response.

Figure 5:
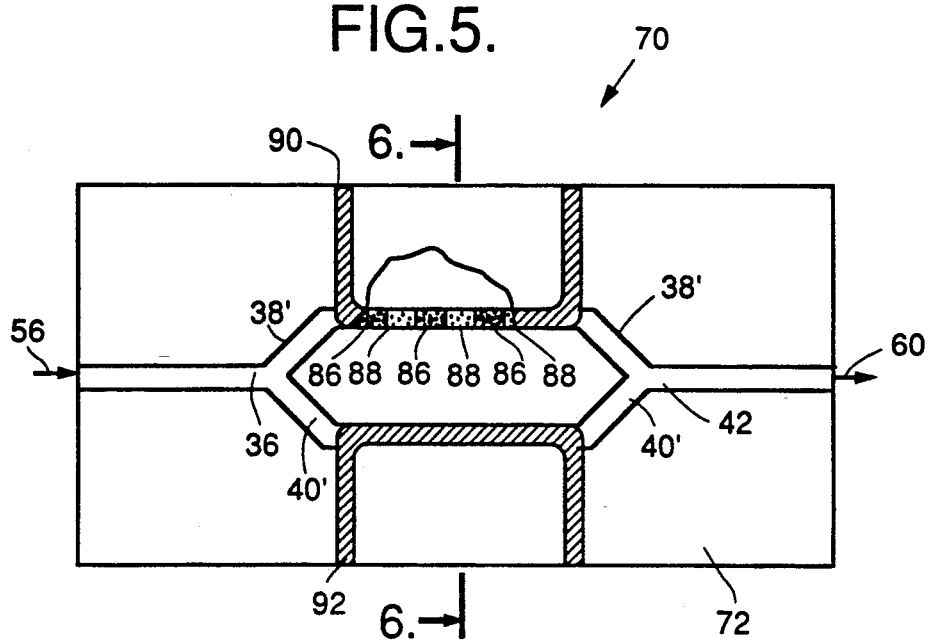
FIG. 5 is a top view of an electro-optic modulator in accordance with an alternate embodiment of the present invention.
Figure 6:
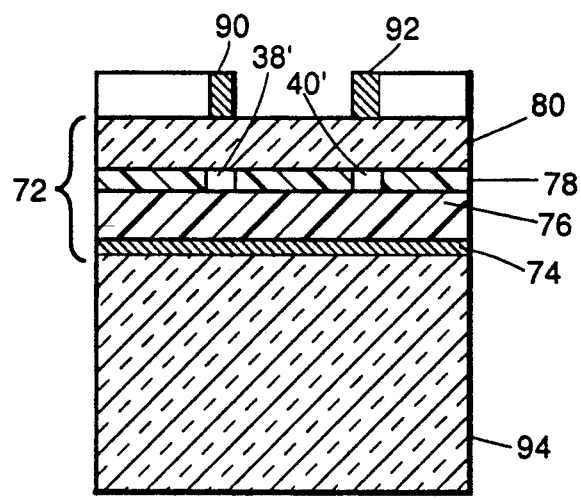
FIG. 6 is a cross-sectional view taken along lines 6—6 of FIG. 5.

With particular reference to FIGS. 5 and 6, an alternate embodiment of the periodic domain reversal electro-optic modulator is shown therein in accordance with an alternate embodiment of the present invention. The alternate embodiment of the electro-optic modulator 70 is fabricated with an electro-optic polymer 78 which may include an organic polymeric nonlinear optical material such as 4-dimethylamino 4'-nitrostilbene (DANS). A conductive ground plane 74 is disposed on the silicon substrate material 94 to form a microstrip RF transmission line. A cladding layer 76 is disposed on top of the conductive ground plane 74 and has a thickness of approximately four (4) microns. An electro-optic polymer layer 78 is disposed on top of the cladding layer 76 and has a preferred thickness of approximately two (2) microns. A second cladding layer 80 is further disposed on top of the electro-optic polymer layer 78.

The electro-optic polymer layer 78 contains a pair of optical waveguide channels 32' and 40' which are formed in accordance with photo bleaching techniques known in the art. One such photo bleaching technique is described in an article by D.G. Girton, et al., entitled "20 GHz Electro-Optic Polymer Mach-Zehnder Modulator", *Appl. Phys. Lett.* 58 (16), Apr. 22, 1991, pgs. 1730-32. Inverted and non-inverted regions 86 and 88 are formed in optical waveguide channels 38' and 40' by polling the electro-optic polymer 78 with an electric field so as to align the ferroelectric domains accordingly. A pair of active conductive lines 90 and 92 are formed on top of the second cladding layer 80 for inducing an electromagnetic field from each of the conductive lines 90 and 92 to the ground conductive plane 74. As a consequence, the electric field passes directly through each of the optical waveguide channels 38' and 40' to provide phase modulation thereto.

In view of the foregoing, it can be appreciated that the present invention enables the user to achieve an enhanced electro-optic modulator (30 or 70) which compensates for phase velocity mismatches. Thus, while this invention has been disclosed herein in combination with particular examples thereof, no limitation is intended thereby except as defined in the following claims. This is because a skilled practitioner recognizes that other applications can be made without departing from the spirit of this invention after studying the specification and drawings.

What is claimed is:
1. An electro-optic modulator comprising:
a substrate having a ferroelectric domain;
optical waveguide means formed in said substrate penetrating at least one opposite change in direction in said ferroelectric domain;
optical input means for coupling an optical input signal to the optical waveguide means;
RF waveguide means formed on said substrate and applying an electric field to a region overlying the optical waveguide means to thereby induce modulation of said optical signal;
electric drive source means for coupling an RF electric signal to the RF waveguide means;
periodically inverted and non-inverted regions which compensate for phase differences within said modulation; and
optical output means for providing a modulated optical output signal.

2. The modulator as defined in claim 1 wherein said optical waveguide means comprises at least two generally parallel optical waveguide channels.

3. The modulator as defined in claim 2 wherein said modulated output signal is amplitude modulated.

4. The modulator as defined in claim 1 wherein said RF waveguide means comprises a coplanar waveguide which includes:
a first metallic conductor for receiving said RF electric signal; and
a second metallic ground conductor coupled to ground and separated from said first metallic conductor for generating said electric field therebetween.

5. The modulator as defined in claim 4 wherein said substantially parallel optical waveguide channels are located substantially within a modulator active region bounded by said first and second metallic conductors.

6. The modulator as defined in claim 1 wherein said ferroelectric domain comprises a plurality of substantially parallel alternating inverted and noninverted regions.

7. The modulator as defined in claim 1 wherein said substrate comprises lithium niobate (LiNbO$_3$).

8. The modulator as defined in claim 1 wherein said substrate comprises a polymer.

9. The modulator as defined in claim 1 wherein said inverted and non-inverted regions within said ferroelectric domain are located in an alternating manner to compensate for phase difference between said modulation and said RF signal when said difference is substantially 180 degrees.

10. An electro-optic modulator comprising:
a substrate having a ferroelectric domain;
an optical waveguide having at least two generally parallel optical waveguide channels formed in said substrate;
an RF waveguide formed on said substrate and having a modulator active region overlying the optical waveguide channels;
optical input means for coupling an optical signal of a given phase to the optical waveguide;
electromagnetic drive source means for coupling electromagnetic energy to the RF waveguide;
periodically inverted and non-inverted regions for changing the direction of the electric field at locations where said optical signal and said RF signal are substantially 180 degrees out of phase; and
optical output means for providing an amplitude modulated optical output signal.

11. The modulator as defined in claim 10 wherein said ferroelectric domain comprises a plurality of substantially parallel alternating inverted and noninverted regions within said optical waveguides.

12. The modulator as defined in claim 10 wherein said optical waveguide means comprises at least two generally parallel optical waveguide channels.

13. The modulator as defined in claim 10 wherein phase modulated optical signals are provided from each of said optical waveguide channels to form said amplitude modulated output signal.

14. The modulator as defined in claim 10 wherein said substrate comprises lithium niobate (LiNbO$_3$).

15. The modulator as defined in claim 10 wherein said substrate comprises a polymer.

16. A method for modulating an optical signal comprising:
supplying an optical input signal to an optical waveguide that is fabricated in a substrate;
splitting said optical input signal between first and second optical waveguide channels;
generating an electric signal across said optical waveguide within an active modulation region so as to induce phase modulation;
applying said optical input signal through said optical waveguide via inverted and non-inverted regions of a ferroelectric domain found within said active modulation region; and combining said phase modulated optical signals from each of said first and second optical waveguide channels to provide a modulated output signal.

17. The method as defined in claim 16 wherein said substrate comprises lithium niobate (LiNbO$_3$).

18. A method for modulating an optical signal comprising:
supplying an optical input signal to an optical waveguide that is fabricated in a substrate comprising a polymer;
generating an electric signal across said optical waveguide within an active modulation region so as to induce phase modulation;
applying said optical input signal through said optical waveguide via inverted and non-inverted regions of a ferroelectric domain found within said active modulation region; and
supplying a modulated output signal.

* * * * *